(12) United States Patent
Shniberg et al.

(10) Patent No.: US 7,376,276 B2
(45) Date of Patent: *May 20, 2008

(54) INDEXING, STORAGE AND RETRIEVAL OF DIGITAL IMAGES

(75) Inventors: Moti Shniberg, Elkannah (IL); Yaron Nemet, Kedumim (IL)

(73) Assignee: ImageID Ltd, Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/704,424

(22) Filed: Feb. 9, 2007

(65) Prior Publication Data

US 2007/0230799 A1    Oct. 4, 2007

Related U.S. Application Data

(63) Continuation-in-part of application No. 09/941,503, filed on Aug. 28, 2001, now Pat. No. 7,203,367.

(60) Provisional application No. 60/228,963, filed on Aug. 29, 2000.

(51) Int. Cl.
G06K 9/62    (2006.01)

(52) U.S. Cl. ..................... 382/224; 382/305

(58) Field of Classification Search ................ 382/103, 382/118, 159, 181, 190, 224–225, 278, 305; 358/403; 707/1–10
See application file for complete search history.

(56) References Cited

U.S. PATENT DOCUMENTS 5,813,984 A * 9/1998 Haaga et al. ............... 600/410

6,608,563 B2 * 8/2003 Weston et al. ............ 340/573.1
6,922,201 B2 * 7/2005 Blish et al. ................. 345/646

OTHER PUBLICATIONS

Kuchinsky, et al. "Fotofile: A consumer multimedia organization and retrieval system", pp. 496-503, May 1999.*
Oh, et al. "Content based retrieval system for image using face information", pp. 12-19, Jan. 2000.*
Lanitis, et al "Toward Automatic Simulation of Aging Effects on Face Images", IEEE, pp. 442-455, Apr. 2002.*

* cited by examiner

Primary Examiner—Daniel Mariam
(74) Attorney, Agent, or Firm—Goodwin Procter LLP (57) ABSTRACT

A multi-user system and method of processing still images is provided which includes receiving a set of images from, e.g., multiple remote sources having sub-images of faces. Faces are identified as sub-images in the images and the set is then indexed according to each sub-image. Index icons in the form of thumbnail images of identified faces can be used as indexes in retrieving an indexed sub-set of images that have the face of at least one person in common. The indexed images can be retrieved and displayed remotely from a database receiving and storing the images; multiple users can contribute to the database and any allowed user can retrieve indexed sub-sets of the same. Age-progression software is integrated in the system and method for indexing images acquired years or even decades apart. Optional highlighting of the face common to all images in the indexed sub-set is provided.

25 Claims, 8 Drawing Sheets

INDEXING, STORAGE AND RETRIEVAL OF DIGITAL IMAGES

CROSS-REFERENCE TO RELATED APPLICATIONS

This application claims priority to and is a continuation-in-part application of U.S. Ser. No. 09/941,503, filed Aug. 28, 2001 now U.S. Pat. No. 7,203,367, which is based on and claims priority to U.S. Provisional Patent Application No. 60/228,963 filed on Aug. 29, 2000, both of which are incorporated herein by reference thereto.

FIELD OF THE INVENTION

The present invention relates to electronic archiving, indexing and retrieving images.

BACKGROUND OF THE INVENTION

The following U.S. patents are believed to represent the current state of the art: U.S. Pat. Nos. 6,263,113 B1; 6,108,437; 6,035,074; 6,006,231; 5,978,507; 5,963,670; 5,915,038; 5,905,807; 5,896,462; 5,793,888; 5,764,790.

SUMMARY OF THE INVENTION

The present invention seeks to provide an improved system and methodology for archiving, indexing and retrieving images.

There is thus provided in accordance with a preferred embodiment of the present invention a method for indexing images of persons. The method includes providing image data relating to the images of persons to a suitably programmed computer, employing a first suitably programmed computer functionality to provide face recognition of the images, employing a second suitably programmed computer functionality to group the images according to faces recognized therein and employing a third suitably programmed computer functionality to provide an index of groups of the images organized according to faces recognized therein.

There is also provided in accordance with a preferred embodiment of the present invention a system for indexing images of persons. The system includes an image data source providing image data relating to the images of persons to a suitably programmed computer, a first suitably programmed computer functionality providing face recognition of the images, a second suitably programmed computer functionality grouping the images according to faces recognized therein and a third suitably programmed computer functionality providing an index of groups of the images organized according to faces recognized therein.

Further in accordance with a preferred embodiment of the present invention the method also includes employing the index for retrieving, viewing and optionally downloading images of an individual person.

Still further in accordance with a preferred embodiment of the present invention at least two of the first, second and third suitably programmed computer functionalities are performed by the suitably programmed computer.

Additionally or alternatively, all of the first, second and third suitably programmed computer functionalities are performed by the suitably programmed computer.

Moreover in accordance with a preferred embodiment of the present invention the index employs a recognized face as an index icon.

Preferably, the steps of providing image data and retrieving, viewing and optionally downloading are carried out via the Internet.

Further in accordance with a preferred embodiment of the present invention the step of providing image data employs a film camera and a scanner.

Alternatively, the step of providing image data employs a digital camera.

Still further in accordance with a preferred embodiment of the present invention the index employs a recognized face as an index icon.

There is also provided in accordance with another preferred embodiment of the present invention a method for classifying images of persons in photographs. The method includes the steps of photographing a plurality of persons in a plurality of scenes, wherein not all of the persons appear in all of the scenes, to provide a plurality of photographs, computer analyzing the plurality of photographs to detect at least the faces of persons in each of the scenes and automatically grouping the photographs according to at least the faces of the persons appearing therein.

There is further provided in accordance with yet another preferred embodiment of the present invention a system for classifying images of persons in photographs. The system includes a photography subsystem photographing a plurality of persons in a plurality of scenes, wherein not all of the persons appear in all of the scenes, to provide a plurality of photographs and a computer analysis and photograph grouping subsystem for computer analyzing the plurality of photographs to detect at least the faces of persons in each of the scenes and automatically grouping the photographs according to at least the faces of the persons appearing therein.

Further in accordance with a preferred embodiment of the present invention the method for classifying images also includes indexing the plurality of photographs at least partially in accordance with the faces of the persons appearing therein.

Still further in accordance with a preferred embodiment of the present invention the step of photographing includes photographing the plurality of persons while they are bearing unique identification indications. The step of computer analyzing includes face recognition of the faces of the persons appearing in the photographs, recognition of the unique identification indications and correlation of the faces with the unique identification indications.

Additionally in accordance with a preferred embodiment of the present invention the step of computer analyzing includes image indication assisted face recognition.

Further in accordance with a preferred embodiment of the present invention the step of face recognition includes image indication assisted face recognition.

Moreover in accordance with a preferred embodiment of the present invention the step of grouping the photographs employs the step of correlating the faces with the unique identification indications.

Additionally in accordance with a preferred embodiment of the present invention the steps of grouping and indexing the photographs employs correlating the faces with the unique identification indications.

The present invention also provides a method of processing still images which includes receiving a set of still images, at least one of which includes an image or so-called sub-image of a face. At least some of the still images can be received from one or more remote sources, for example, via the Internet. The method further includes processing each image to recognize and identify the sub-images of faces in the set of still images. Each sub-image is then associated with either a recognized person or with an unidentified person using information from the sub-images. The set of still images is then indexed according to each of the sub-images.

A recognized person is a person identifiable by a user of the system, whereas an unidentified person is one that is not identifiable by a user of the system. In either case, the method can optionally include associating an indexed sub-set of still images with another sub-image of a recognized or unidentified person supplied by a user of the system to find all images in the set of still images that include a likeness of the supplied sub-image.

In one aspect, the method includes providing an index icon in the form of a thumbnail image corresponding to a representative sub-image to use as an index for each indexed set or sub-set of still images.

The method preferably further includes providing a sub-set of the set of still images in response to a request from a user for retrieval of the indexed still images. Accordingly, the indexed sub-set includes all still images indexed according to the sub-images identified with the recognized or unidentified person.

The method can further include displaying the retrieved sub-set for viewing by a user. In one aspect, the method also includes the option of highlighting the face of the recognized or unidentified person as it appears in each still image in the retrieved sub-set. The displaying step can also include displaying thumbnail images of the still images in the retrieved sub-set, wherein each thumbnail image can be enlarged by selection thereof, for example, by the click of a mouse or by a keystroke. The images can be viewed by a user over the Internet.

In one aspect, the indexed sub-set comprises at least one still image acquired at a time later than another still image was acquired, so that the faces appear in aged progression in the later-acquired still image in comparison with the an earlier acquired still image. Faces which have aged by at least five years, or even ten years or more can still be associated with and indexed with faces of the same person.

The invention also provides a method of processing still images, which includes receiving a set of still images, at least one of which includes at least one sub-image of a face. The method further includes detecting the location of each sub-image by recognizing each of the facial sub-images as a face. The method additionally includes indexing the set of still images according to the at least one sub-image using information from each still image in the set of still images.

The indexing step preferably includes forming a plurality of sub-sets of the set of still images, each of the plurality of sub-sets including all still images from the set including the sub-image of a face associated with the same person.

In addition, an index icon can be associated with each sub-set of facial sub-images of the same recognized or unidentified person.

An indexed sub-set can then be provided in response to a user selecting the index icon associated therewith. In one aspect, the method further includes displaying the indexed sub-set selected by a user.

Any of the receiving, providing, and displaying steps can be performed via the Internet. In addition, the receiving step can include receiving the set of still images from one or more remote sources.

A system for processing still images is also provided, which includes a database for receiving, storing and providing access to a set of still images acquired from one or more sources; a face recognition unit for recognizing one or more sub-images in the set of still images that correspond to one or more faces; and an indexer to index the set of still images according to each of the facial sub-images, forming indexed sub-sets of the set associated with the facial sub-images.

The system preferably includes a communication unit for remote transmission and reception of the still images, wherein the one or more sources includes at least one remote source accessible via the Internet.

In one aspect, the system includes an image retriever for retrieving one of the indexed sub-sets of still images for access by a user of the system in response to a request from the user for retrieving the indexed sub-set. The system also preferably includes a display unit for displaying the indexed sub-set for viewing by the user, where the display unit can be remotely located from the database of the system. In an additional aspect, the display unit can be adapted to highlight the facial sub-image in each still image of the viewed indexed sub-set corresponding to the indexed facial sub-image.

In one aspect, the indexer generates an index icon associated with each sub-set of the facial sub-images, and the image retriever is adapted to retrieve the indexed set in response to a user selecting the index icon associated therewith.

In another aspect, the face recognition unit is adapted to recognize and index an age-progressed face.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
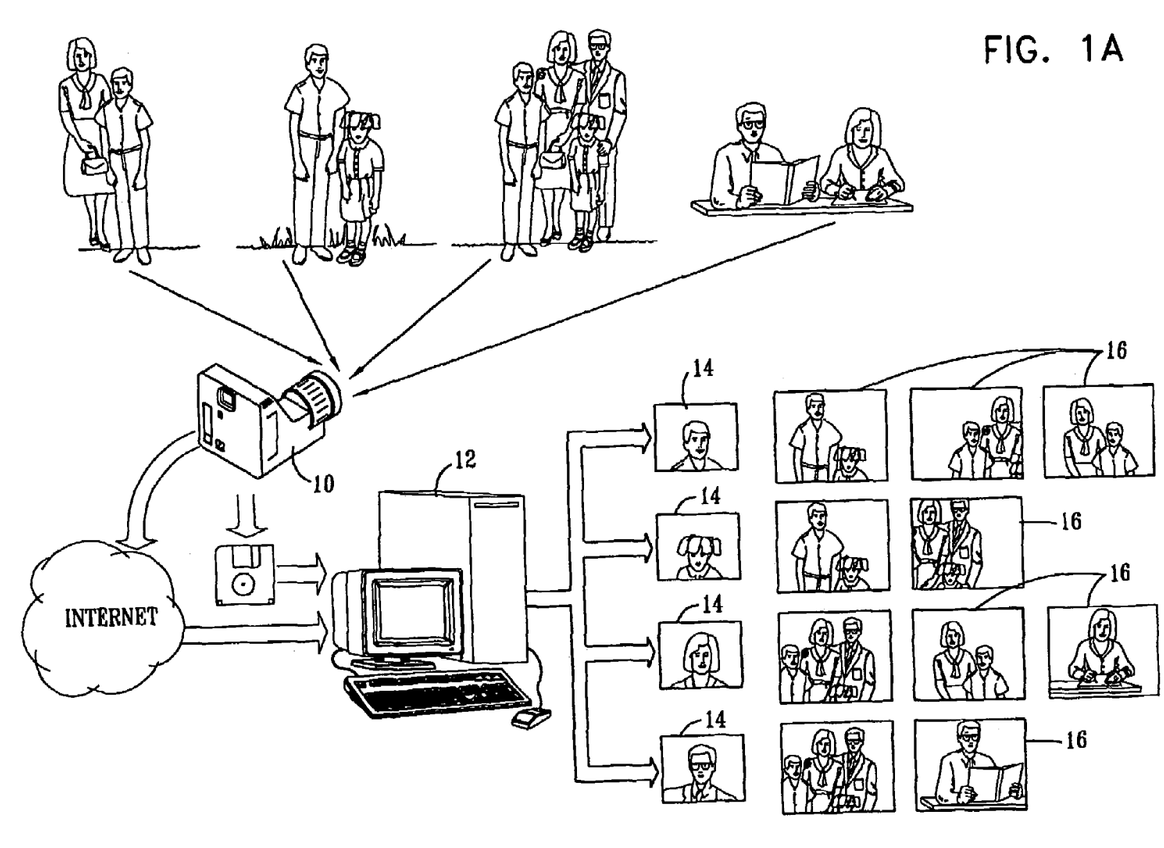
FIGS. 1A and 1B are simplified pictorial illustrations of a system and methodology for archiving images in accordance with two variations of a preferred embodiment of the present invention.
Figure 1B:
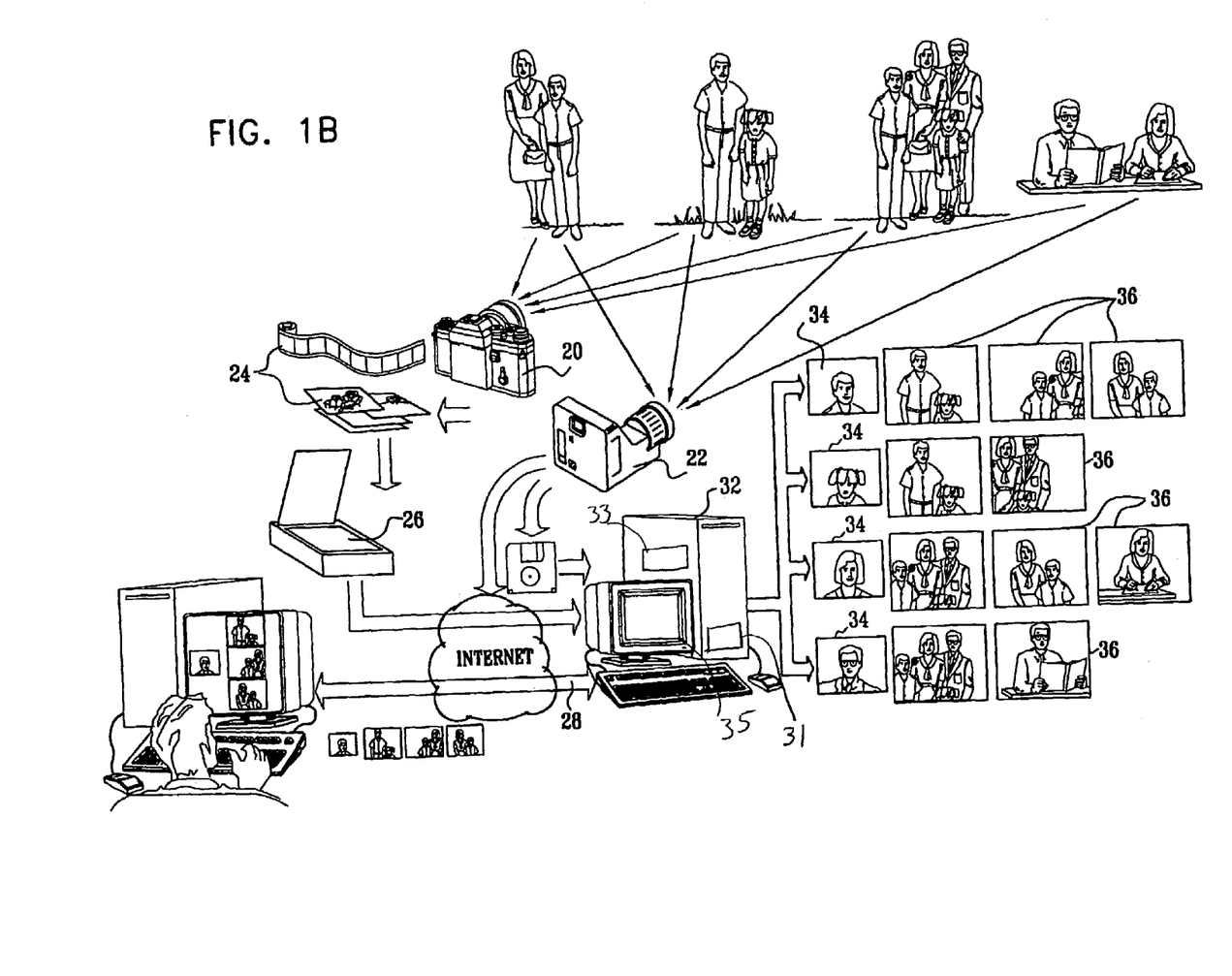

Reference is now made to FIGS. 1A and 1B, which are simplified pictorial illustrations of a system and methodology for archiving images in accordance with two variations of a preferred embodiment of the present invention.

As seen in FIG. 1A, scenes in which various persons are present are photographed in a plurality of settings and groupings. Not all of the persons appear in each scene. The photographs are provided, typically in electronic form, from a camera 10 to a suitably programmed computer 12, which is operative to index the photographs according to images of persons appearing therein. Transmission of image data to the computer 12 may be effected directly or via a computer network, such as the Internet, in any suitable manner. Thus, the computer 12 is operative typically to provide a thumbnail image 14 of each person photographed, which thumbnail may serve as an index icon for viewing the thumbnail images of all of the photographs 16 in which that person appears.

In accordance with a preferred embodiment of the present invention, the computer 12 carries out face recognition on the images of the persons in the various photographs and is operative to recognize the same people in different photographs notwithstanding certain changes in their visual appearance and orientation.

Such changes can include those associated with age progression, so that even if the images provided were acquired at substantially different times, for example, years, or even decades apart, a face of a person who has aged from one image to another can still be identified.

Turning to FIG. 1B it is seen that the scenes, in which various persons are present, are similarly photographed in a plurality of settings and groupings wherein not all of the persons appear in each scene. Either or both a conventional film camera 20 and a digital camera 22 may be employed. Where a conventional film camera is employed, the photographs or negatives 24 may be scanned by a scanner 26 in a conventional manner and the electronic output thereof may be provided to a suitably programmed computer 32. The output from digital camera 22 may be provided in electronic form to computer 32. Transmission of image data to the computer 32 may be effected directly or via a computer network 28, such as the Internet, in any suitable manner. The computer 32 includes a communications unit 31 for this purpose. The computer 32 is also preferably equipped with data storage 33, of any commercial type, for maintaining a database of images for storing, indexing and retrieving. Still images can be provided to the database from any number of sources, including from numerous remote sources. In addition, a display 35, which can be local or remote from the database 33, is provided for viewing images retrieved. Thus, the computer 32 is operative typically to provide a thumbnail image 34 of each person photographed, which thumbnail may serve as an index icon for viewing the thumbnail images of all of the photographs 36 in which that person appears.

As in the embodiment of FIG. 1A, computer 32 preferably carries out face recognition on the images of the people in the various photographs and is operative to recognize the same people in different photographs notwithstanding certain changes in their visual appearance, orientation, and age.

It is to be appreciated that the present invention does not require that the computer 32 be located adjacent to either the scanner 26 or to the digital camera 22. A preferred embodiment of the invention employs communication over a computer network 28, such as the Internet, with a remote processing computer, such as computer 32, and retrieving and viewing of the index of the icon images 34 and retrieving and viewing groups of thumbnail images 36 for each icon and optionally downloading the complete photograph of one or more of the thumbnail images 36 from the computer 32, over the Internet to a plurality of users. This preferred Internet embodiment is also applicable to the embodiment of FIG. 1A.

Accordingly, photographs or still images from any device can be uploaded to a remote site by multiple users, and then indexed and viewed by any allowed user. For example, any number of members of a family or extended family can provide still images to an on-line photo album for indexing, retrieving, and viewing by any allowed user. Preferably the site is password protected to restrict access as desired. The images provided can include both scanned images from old photographs, black and white or color, and digital images acquired in more recent times. The facial recognition features of the invention allow identification of faces of persons who have aged significantly from one still image to another, from one, five, ten or even over twenty years. As a result, users (e.g., family members) can sort and view images obtained from many different sources according to a particular person or persons of interest, ever over a person's lifetime.

Figure 2A:
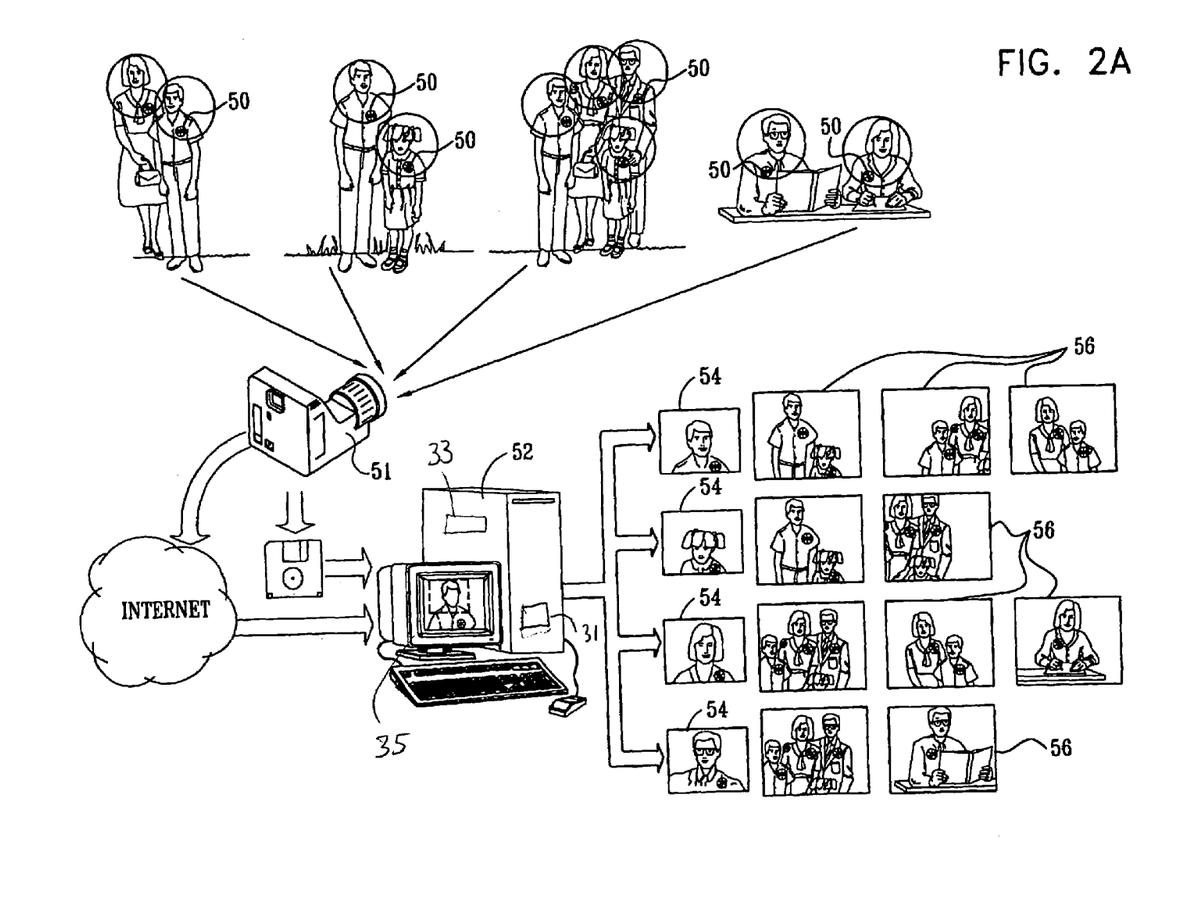
FIGS. 2A and 2B are simplified pictorial illustrations of a system and methodology for archiving images in accordance with two variations of another preferred embodiment of the present invention.
Figure 2B:
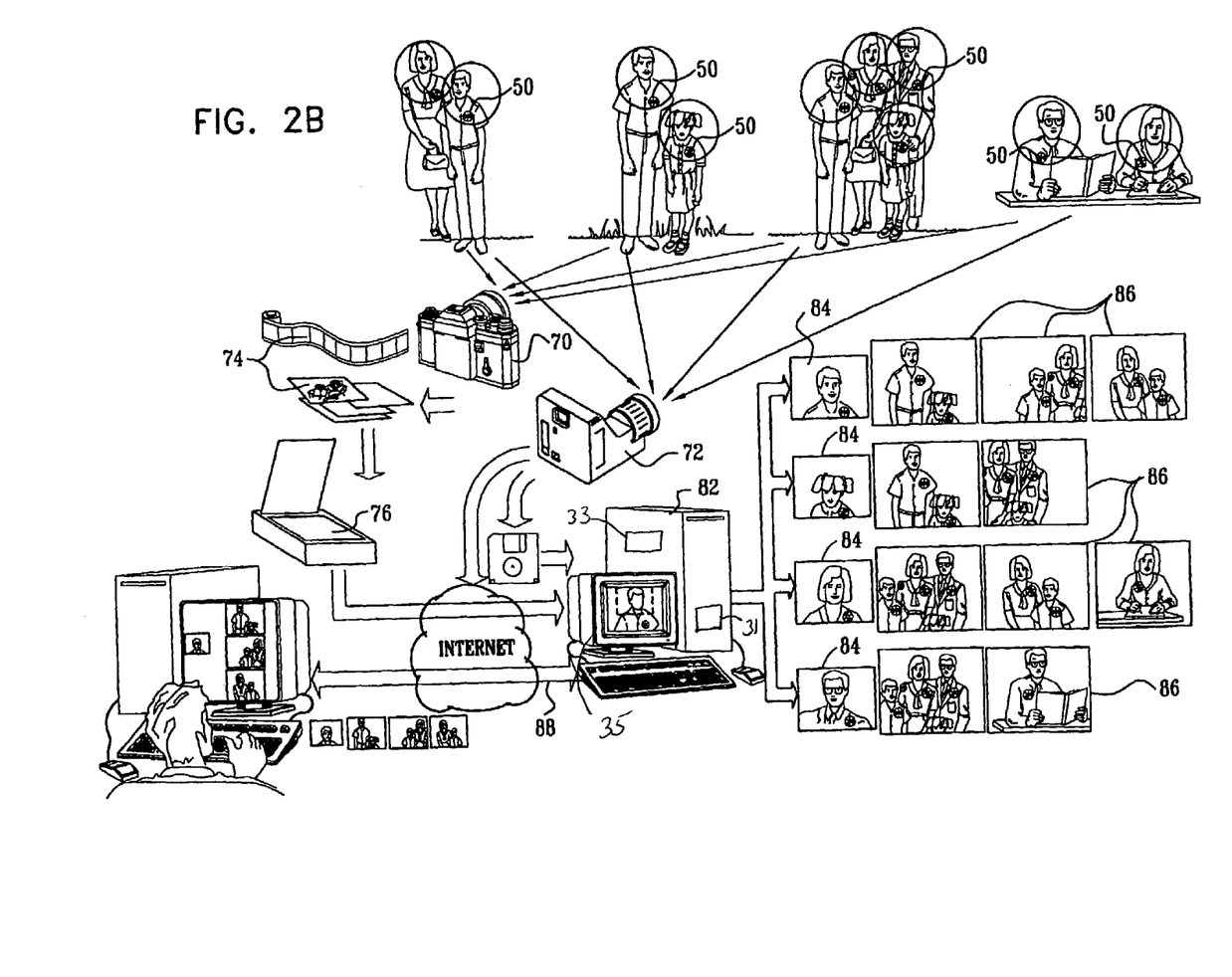

Reference is now made to FIGS. 2A and 2B, which are simplified pictorial illustrations of a system and methodology for archiving images in accordance with two variations of another preferred embodiment of the present invention.

As seen in FIG. 2A, similarly to that shown in FIGS. 1A and 1B, scenes in which various persons are present are photographed in a plurality of settings and groupings wherein not all of the persons appear in each scene.

In distinction to that shown in FIGS. 1A and 1B, each person in each scene preferably wears an identification indication 50 on the upper part of his body. This identification indication is preferably a multi-color, color coded identification indication commercially available from ImageID Inc. of One Penn Plaza, New York, N.Y. under the VIVIDOT trademark. A preferred embodiment of the identification indication is described in applicant/assignee's U.S. patent application Ser. No. 09/508,300, filed Mar. 9, 2000 and entitled "Image Identification and Delivery System", the disclosure of which is hereby incorporated by reference and appears in Published PCT Patent Application WO 00/04711, the disclosure of which is hereby incorporated by reference. The identification indication 50 worn by each person is unique and visually distinguishable from the identification indication 50 worn by each other person.

As in the embodiments of FIGS. 1A and 1B, the photographs are provided, typically in electronic form, from a camera 51 to a suitably programmed computer 52, which is operative to group the photographs according to each person appearing therein. In this embodiment, each person is distinguished from each other person, not only by the face of the person but also by the identification indication 50 worn by that person. The computer reads the identification indication 50 and typically derives a code sequence uniquely corresponding thereto. Similarly, the computer preferably employs a code sequence uniquely corresponding to each face in each photograph. Thus, it is appreciated that in the embodiment of FIGS. 2A and 2B, the computer preferably employs image data taken from the photographs to key each face to a unique identification indication 50 and vice versa.

Thus, the computer 52 is operative, preferably by using not only face recognition but also recognition of the unique identification indications 50, to provide a thumbnail image 54 of each person photographed, which thumbnail may serve as an icon for viewing the thumbnail images of all of the photographs 56 in which that person appears. Transmission of image data to the computer 52 may be effected directly or via a computer network, such as the Internet, in any suitable manner.

By virtue of the face recognition carried out by the computer 52 on the images of the people in the various photographs and by virtue of the recognition of the unique identification indications, the computer is provided with an enhanced ability to recognize the same people in different photographs notwithstanding certain changes in their visual appearance, orientation, and age from image to image. Thus, even if only one of the face and the identification indication is recognizable in a photograph, the photograph can nevertheless be indexed.

It is also a particular feature of the embodiment of FIG. 2A that the suitably programmed computer 52 carries out face recognition with the assistance of the identification indication 50. Preferably, the computer 52 recognizes each identification indication 50 and identifies its location as the upper part of a human body. The computer 52 then looks for a face at a location generally above and adjacent to the upper part of the human body. This identification indication aided face recognition enables enhanced ease, speed and accuracy of face recognition. Thus, the computer 52 is operative typically to provide an index icon 54 for viewing all of the groups of thumbnail images 56 in which that person appears. The viewer may optionally download the complete photograph of a thumbnail image by double clicking on the thumbnail image 56.

Turning to FIG. 2B, it is seen that the scenes in which various persons are present are similarly photographed in a plurality of settings and groupings wherein not all of the persons appear in each scene. Either or both a conventional film camera 70 and a digital camera 72 may be employed. Where a conventional film camera is employed, the photographs or negatives 74 may be scanned by a scanner 76 in a conventional manner and the electronic output thereof may be provided to a suitably programmed computer 82. The output from digital camera 72 may be provided in electronic form to computer 82. Transmission of image data to the computer 82 may be effected directly or via a computer network 88, such as the Internet, in any suitable manner.

As in the embodiment of FIG. 2A, computer 82 carries out image indication assisted face recognition on the images of the people in the various photographs and is operative to recognize the same people in different photographs notwithstanding certain changes in their visual appearance and orientation.

It is to be appreciated that the present invention does not require that the computer 82 be located adjacent to either the scanner 76 or to the digital camera 72. A preferred embodiment of the invention employs communication over a computer network 88, such as the Internet, with a remote processing computer, such as computer 82, and retrieving and viewing of the index icons 84. The user may then retrieve and view groups of the thumbnail images 86 for each icon and optionally download a complete photograph of one or more of the thumbnail images 86 from the computer 82, over the Internet, to a plurality of users. This preferred Internet embodiment is also applicable to the embodiment of FIG. 2A.

Images can also be obtained from video frames or still images obtained from video streams, either digital or film.

Figure 3:
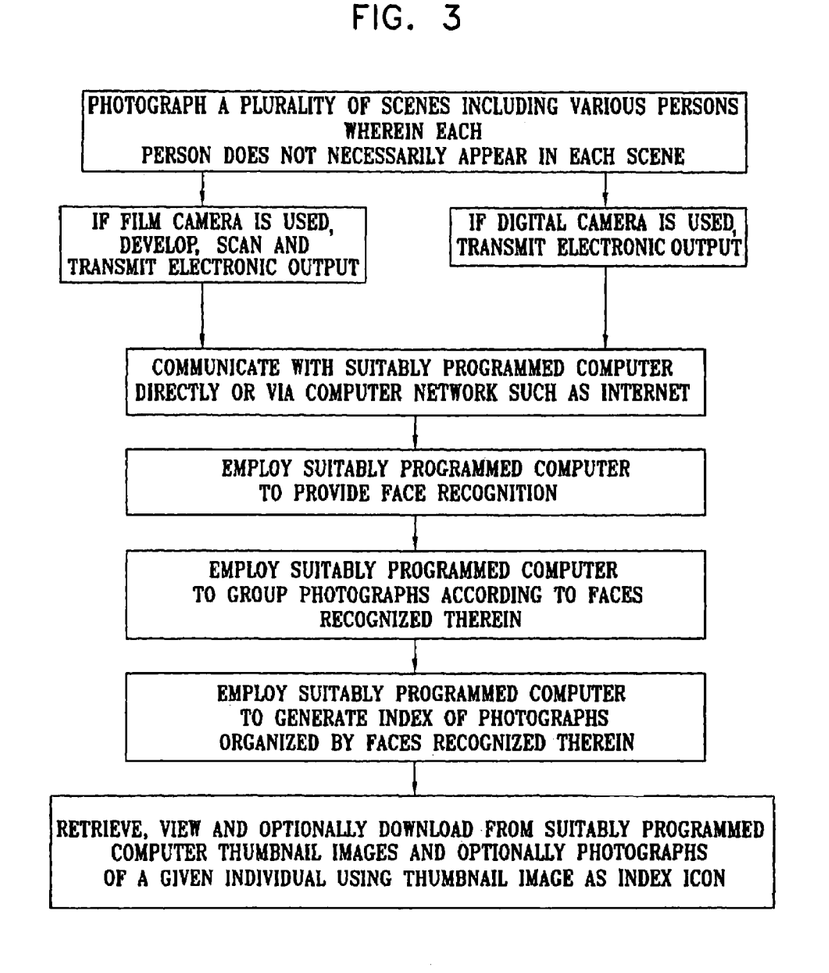
FIG. 3 is a simplified flowchart illustrating the functionality of the embodiment of FIGS. 1A and 1B.

Reference is now made to FIG. 3, which is a simplified flowchart illustrating the functionality of the embodiment of FIGS. 1A and 1B. As seen in FIG. 3, a plurality of scenes are photographed. Each scene typically includes one or more persons. Typically, each person photographed in a scene does not appear in all of the photographs.

If a film camera is employed, the film is developed and may be printed. Either the negatives or the prints are scanned using a conventional scanner. If a digital camera is employed, the electronic output thereof is downloaded from the camera using any suitable technique or media. Images can also be obtained from video frames or still images obtained from video streams, either digital or film.

The resulting image content in electronic form may be supplied to a suitably programmed computer in any suitable manner. The computer may be any suitable computer. In accordance with a preferred embodiment of the present invention, the image content may be transmitted to a remote computer via the Internet.

The suitably programmed computer preferably is programmed with face recognition software. Such software may be entirely conventional. Examples of commercially available software for this purpose include:

FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A.

The computer is also preferably programmed with age-progression software. Such software can be used to create sequentially age-progressed images of faces from older photographs to compare to more recently acquired images as an aid in indexing still images according to common faces, when such images were acquired years or even decades apart.

Upon achievement of face recognition of faces of persons in the various images represented by the image content, the same computer or another suitably programmed computer is employed to group photographs according to the persons whose faces are recognized therein. Each such group of photographs is preferably indexed. A preferred image icon is a thumbnail image of the face of each person appearing in one or more photographs.

Preferred functionality for carrying out the face recognition-based grouping and indexing functionalities described in the preceding paragraph is described hereinbelow with reference to FIG. 5.

Once an index of photographs organized by the face recognized therein has been generated, it may be retrieved and viewed by any authorized user. The group of thumbnail images associated with each index icon may be retrieved and viewed by any authorized user by preferably clicking on an index icon, which may advantageously be a thumbnail image of a recognized face.

Figure 4:
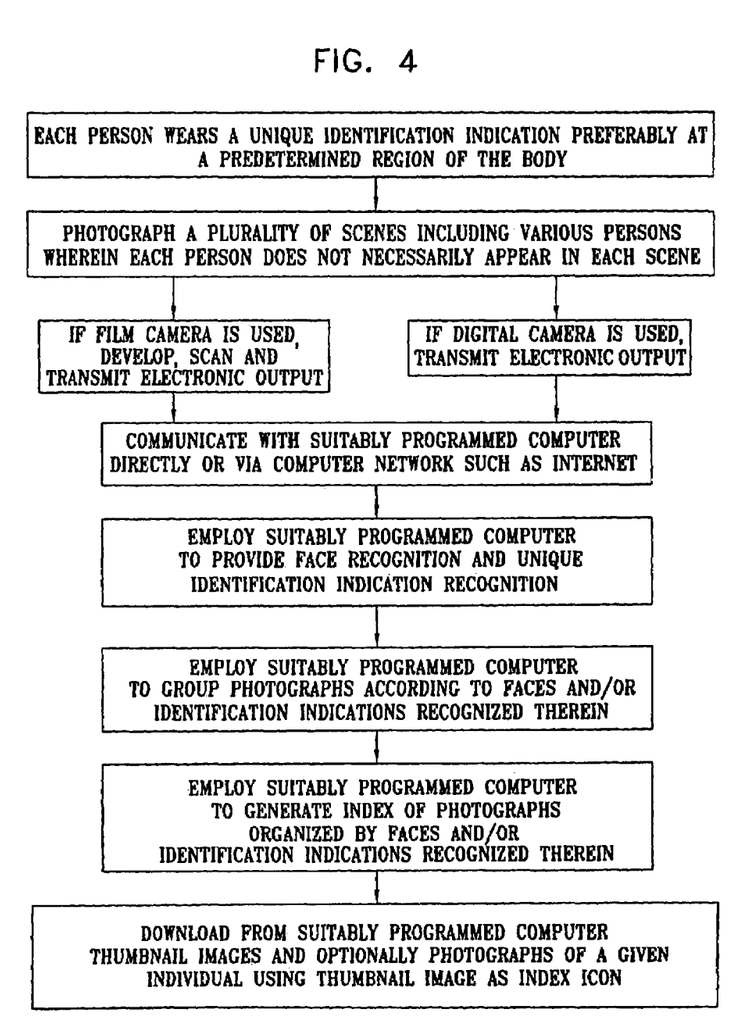
FIG. 4 is a simplified flowchart illustrating the functionality of the embodiment of FIGS. 2A and 2B.

Reference is now made to FIG. 4, which is a simplified flowchart illustrating the functionality of the embodiment of FIGS. 2A and 2B. As seen in FIG. 4, a plurality of scenes are photographed. Each scene typically includes one or more persons. Typically, each person photographed in a scene does not appear in all of the photographs.

In distinction to that described hereinabove with reference to FIG. 3, each person in each scene preferably wears a unique identification indication on his body. If a film camera is employed, the film is developed and may be printed. Either the negatives or the prints are scanned using a conventional scanner. If a digital camera is employed, the electronic output thereof is downloaded from the camera using any suitable technique or media.

The resulting image content in electronic form may be supplied to a suitably programmed computer in any suitable manner. The computer may be any suitable computer. In accordance with a preferred embodiment of the present invention, the image content may be transmitted to a remote computer via the Internet.

The suitably programmed computer preferably is programmed with identification indication recognition software, which is available for license on commercial terms from ImageID Inc. Once an identification indication has been recognized, the suitably programmed computer employs the location of the identification indication as a directional cue to assist in face recognition.

Preferred functionality for carrying out image indication assisted face recognition is described hereinbelow with reference to FIG. 6.

Preferably once both a face and a corresponding unique identification indication have been recognized, they are keyed together and both employed for identifying a given person in a photograph.

Upon achievement of face recognition of faces and unique identification indications of persons in the various images represented by the image content, the same computer or another suitably programmed computer is employed to group photographs according to the persons at least one of whose faces and identification images are recognized therein. Each such group of photographs is preferably indexed. A preferred image icon is a thumbnail image of the face of each person appearing in one or more photographs.

Preferred functionality for carrying out the face recognition-based grouping and indexing functionalities described in the preceding paragraph is described hereinbelow with reference to FIG. 5.

Once an index of photographs organized by the face recognized therein has been generated, it may be retrieved and viewed by any authorized user. The group of thumbnail images associated with each index icon may be retrieved and viewed by any authorized user by preferably clicking on an index icon for viewing all of the groups of the thumbnail images in which that person appears. The viewer may optionally download a complete picture of a thumbnail image by double clicking on the thumbnail image.

In one embodiment, a highlighting option that can be turned on or off is provided. Once a set of still images is retrieved according to a particular index, the face or faces corresponding to the particular index in each image in the indexed set can be highlighted using this option. The highlighting can include lightening the face and an area around the face, for example, in the outline of an oval, or encircling an area around the face with a lined border, preferably of an oval shape.

Figure 5:
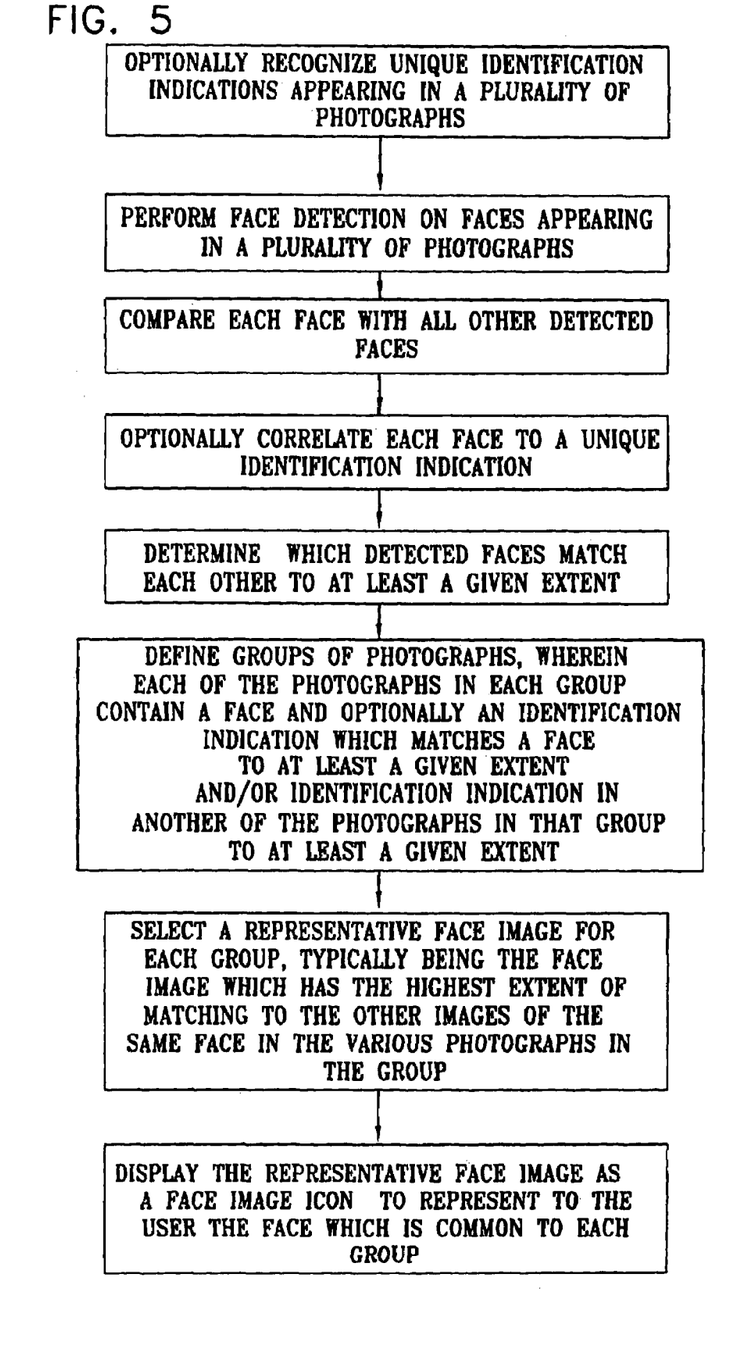
FIG. 5 is a simplified flowchart illustrating photograph grouping and indexing functionality employed in accordance with a preferred embodiment of the present invention.

Reference is now made to FIG. 5, which is a simplified flowchart illustrating photograph grouping and indexing functionality employed in accordance with a preferred embodiment of the present invention.

As seen in FIG. 5, face detection is preferably performed on all faces appearing in a plurality of photographs to be grouped, using any suitable face detection software, such as, for example:

FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A.

Preferably, each detected face is compared with all other detected faces in order to determine which detected faces match each other to at least a predetermined extent. Additionally a similar functionality is preferably carried out with recognized identification indications in order to determine which detected identification indications match each other. Photographs each containing an image of what appears to be the same face and or an image of an identification indication corresponding to that face are grouped together. It is appreciated that within each group, the various images of the "same face" may resemble each other to a greater or lesser extent and in some cases, images of the "same face" may not resemble each other. It is preferably a condition for a photograph belonging to a group that the image of a face in the photograph resembles most of the images of the face in the other photographs in the group to at least a given extent.

In addition, images of one or more faces can be provided of known persons for identifying and indexing all still images containing sub-images of faces of the provided known persons. Accordingly, once faces are located in the scene, each detected face can be classified as belonging to one of the known or recognized persons or as unidentified. Accordingly, in addition to comparing each detected face with all other faces to group images according to the "same face," the same face can also be identified with a known person by comparing sub-images of the "same face" with the known face supplied. If the "same face" cannot be linked to a know person, the sub-image of the face is classified as an unidentified face. Nevertheless, the unidentified face is still grouped with other still images containing the same (unidentified face), and can be indexed according to an imaged of the unidentified face. From a grouping of such images containing the same unidentified face, it is more likely that a user might eventually be able to determine the identity of this unidentified person. The image supplied of the known person can also serve as an index icon.

Figure 6:
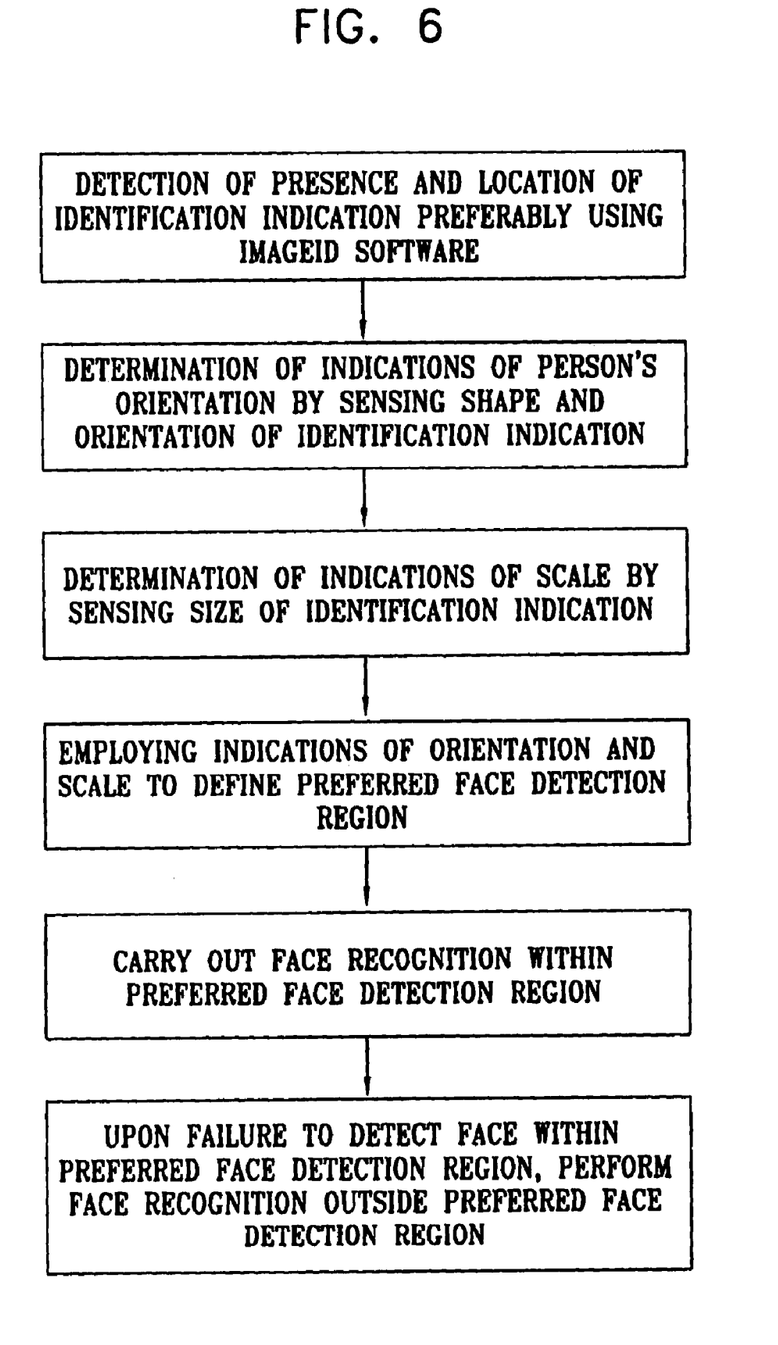
FIG. 6 is a simplified flowchart illustrating image indication assisted face recognition functionality employed in accordance with a preferred embodiment of the present invention.

Though not included as separate steps in FIGS. 4-6, processing of the sub-images of faces can included forming sets of sequentially-aged versions of one or more of the faces to aid the indexing of still images obtained at significantly different times. In this way both older images and recently acquired images can be processed for indexing according to a facial image of a person, even at substantially different ages.

An image index icon is selected to be a representative face image for each group. Typically it is the face image which has the highest extent of matching to the other images of the same face in the various photographs in the group. The image index icon is displayed to a user to represent to the user, the face which is common to each group and thus to indicate the identity of the person who is pictured in each of the photographs in the group.

Reference is now made to FIG. 6, which is a simplified flowchart illustrating image indication assisted face recognition functionality employed in accordance with a preferred embodiment of the present invention. As seen in FIG. 6, image indication assisted face recognition is preferably carried out by initially detecting the presence and location of an identification indication, preferably a VIVIDOT™ identification indication, using software commercially available from ImageID Inc.

Once the location of the identification indication is detected, the shape and orientation of the identification indication may be sensed to provide an indication of a person's orientation relative to the camera. The size of the identification indication provides an indication of scale.

The indications of orientation and scale are employed to define a preferred face detection region. Typically the relative width of this region is a positive function of the relative width of the identification indication. The preferred face detection region is preferably located above the location of the identification indication and is spaced therefrom, typically by a distance which is about one order of magnitude greater than the size of the identification indication.

Face recognition is carried out within the preferred face detection region, preferably using any suitable face detection software, such as, for example:

FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A.

If face recognition is not successful with the preferred face detection region, it is preferably carried out also outside of the preferred face detection region.

In one embodiment, a facial image of one or more known persons is obtained from a database for comparison to the images of faces obtained from a plurality of scenes. The plurality of scenes can be still images from digital or film cameras or video cameras. In one embodiment the plurality of scenes can be obtained as still frames taken at regularly spaced intervals obtained from film or electronically obtained from video cameras, for example, surveillances or security cameras. One skilled in the art will recognize that such a system and method can be used to automatically scan through surveillance or any other film in search of a particular likeness of an identified person. Such surveillance cameras are known to be placed in airports, stores, banks, and any type of security checkpoints. Such video-generated scenes could be scanned to locate and identify faces in the scenes, which are then compared, for example, to facial images of persons from a terrorist, watch list, local police or federal database of wanted or of other persons of interest.

It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

What is claimed is:

1. A method of processing still images, the method comprising:
   receiving a set of still images, each of said still images comprising sub-images at least one of which is a sub-image of a face;
   recognizing each said facial sub-image in said set of still images that is recognizable as a face and detecting the location of each said recognized facial sub-image using information from said still images;
   identifying each said recognized facial sub-image with a recognized person or as an unidentified person using information from said still images; and indexing said set of still images according to said recognized facial sub-images.

2. The method of claim 1, further comprising providing an index icon in the form of a thumbnail image corresponding to a representative recognized facial sub-image of each indexed set.

3. The method of claim 1, further comprising:
   providing a sub-set of said set of still images in response to a request from a user for retrieval of said indexed still images, said sub-set comprising all still images indexed under one of said recognized facial sub-images identified with said recognized person or said unidentified person.

4. The method of claim 3, further comprising:
   displaying said retrieved sub-set for viewing by a user.

5. The method of claim 4, further comprising:
   highlighting said sub-image of said recognized person or said unidentified person in each still image in said retrieved sub-set.

6. The method of claim 4, wherein said displaying includes displaying thumbnail images of said still images in said retrieved sub-set, wherein each thumbnail image can be enlarged by selection thereof.

7. The method of claim 4, wherein said providing said sub-set for viewing by a user is performed via the Internet.

8. The method of claim 3, wherein said indexed sub-set comprises at least one still image acquired at a time later than another still image was acquired, said at least one of said faces appearing in aged progression in the later-acquired still image in comparison with said another still image.

9. The method of claim 8, wherein said later time is at least five years.

10. The method of claim 8, wherein said later time is at least 10 years.

11. The method of claim 1, wherein said receiving comprises receiving said set of still images from at least one remote source.

12. The method of claim 11, wherein said receiving is performed via the Internet.

13. A method of processing still images, comprising:
    receiving a set of still images, each of said still images comprising at least one sub-image recognizable as a face;
    detecting the location of each of said at least one sub-image, said detecting comprising recognizing each of said at least one sub-image as a face using information from said still images;
    identifying each said recognized facial sub-image using information from said still images; and
    indexing said set of still images according to each said recognized facial sub-image using information from said still images.

14. The method of claim 13, wherein said indexing comprises forming a plurality of sub-sets of said set of still images, each of said plurality of sub-sets comprising all still images from said set comprising said at least one sub-image of a face associated with the same person.

15. The method of claim 14, comprising associating an index icon with one of said at least one sub-image of a face for each sub-image.

16. The method of claim 15, comprising providing one of said indexed sub-sets in response to a user selecting said index icon associated therewith.

17. The method of claim 16, further comprising displaying said one of said indexed sub-sets selected by a user.

18. The method of claim 17, wherein said receiving, said providing, and said displaying are performed via the Internet, and wherein said receiving comprises receiving said set of still images from one or more remote sources.

19. A system comprising:
    a database for receiving storing and providing access to a set of still images acquired from one or more sources, each said still image comprising at least one sub-image of a face;
    a face recognition unit for recognizing said sub-images as faces in said set of still images and for locating and identifying each recognized sub-image of a face using information from said still images; and
    an indexer to index said set of still images according to each said recognized facial sub-image, thereby forming indexed sub-sets of said set associated with each said recognized facial sub-image using information from said still images.

20. The system of claim 19, wherein said one or more sources comprises at least one remote source accessible via the Internet, said system comprising a communication unit for remote transmission and reception of said still images.

21. The system of claim 19, further comprising an image retriever adapted to retrieve one of said indexed sub-sets for access by a user of said system in response to a request from said user for retrieving said one of said indexed sub-sets.

22. The system of claim 21, further comprising a display unit for displaying said one of said indexed sub-sets for viewing by said user.

23. The system of claim 22, said display unit adapted to highlight said facial sub-image in each said still image of said one of said indexed sub-sets corresponding to said indexed facial sub-image.

24. The system of claim 21, wherein said indexer generates an index icon associated with each of said facial sub-images, said image retriever retrieving said one of said indexed set in response to a user selecting said index icon associated therewith.

25. The system of claim 19, wherein said face recognition unit is adapted to identify and index an age-progressed face using information from said still images.

* * * * *

UNITED STATES PATENT AND TRADEMARK OFFICE
CERTIFICATE OF CORRECTION

PATENT NO. : 7,376,276 B2
APPLICATION NO. : 11/704424
DATED : May 20, 2008
INVENTOR(S) : Moti Shniberg et al.

It is certified that error appears in the above-identified patent and that said Letters Patent is hereby corrected as shown below:

On the Title page, in Item (75), Inventors, in column 1, line 1, delete "Elkannah" and insert -- Elkanah --, therefor.

In column 12, line 51, in Claim 19, delete "receiving" and insert -- receiving, --, therefor.

Signed and Sealed this
Twenty-second Day of November, 2011

David J. Kappos
*Director of the United States Patent and Trademark Office*